(12) United States Patent
Kim

(10) Patent No.: US 7,771,085 B2
(45) Date of Patent: Aug. 10, 2010

(54) CIRCULAR LED PANEL LIGHT

(76) Inventor: Steven Kim, 21 Grand Ave. South #604, Palisades Park, NJ (US) 07650

( * ) Notice: Subject to any disclaimer, the term of this patent is extended or adjusted under 35 U.S.C. 154(b) by 379 days.

(21) Appl. No.: 12/007,743

(22) Filed: Jan. 15, 2008

(65) Prior Publication Data
US 2008/0170398 A1    Jul. 17, 2008

Related U.S. Application Data

(60) Provisional application No. 60/880,393, filed on Jan. 16, 2007.

(51) Int. Cl.
*F21V 19/02*    (2006.01)
(52) U.S. Cl. .................. 362/285; 362/249.02; 362/364; 313/292
(58) Field of Classification Search .............. 362/285, 362/286, 287, 288, 296, 346, 365, 366, 148, 362/147, 249.02, 249.03, 249.04; 313/292
See application file for complete search history.

(56) References Cited

U.S. PATENT DOCUMENTS

| | | | | | |
|---|---|---|---|---|---|
| 4,232,361 | A * | 11/1980 | Kelsall | | 362/364 |
| 4,704,664 | A * | 11/1987 | McNair | | 362/225 |
| 6,036,336 | A * | 3/2000 | Wu | | 362/249.03 |
| 6,443,582 | B1 * | 9/2002 | Tarne et al. | | 362/27 |
| 6,685,339 | B2 * | 2/2004 | Daughtry et al. | | 362/249.05 |
| 6,764,204 | B1 * | 7/2004 | Peters | | 362/429 |
| 7,614,769 | B2 * | 11/2009 | Sell | | 362/365 |

* cited by examiner

*Primary Examiner*—Gunyoung T Lee
(74) *Attorney, Agent, or Firm*—Roetzel & Andress, LPA

(57) ABSTRACT

A lighting device comprising: a light emitting diode lighting panel having first and second opposing surfaces; light emitting diodes at a periphery of light emitting diode lighting panel for emitting light through the first surface; a reflective surface at the second surface of the light emitting diode lighting panel; and a power supply unit connected to the light emitting diode panel, the power supply having first and second ends, and electrical circuitry for converting alternating current to direct current between the first and second ends, wherein the first end is for insertion into the a socket.

17 Claims, 13 Drawing Sheets

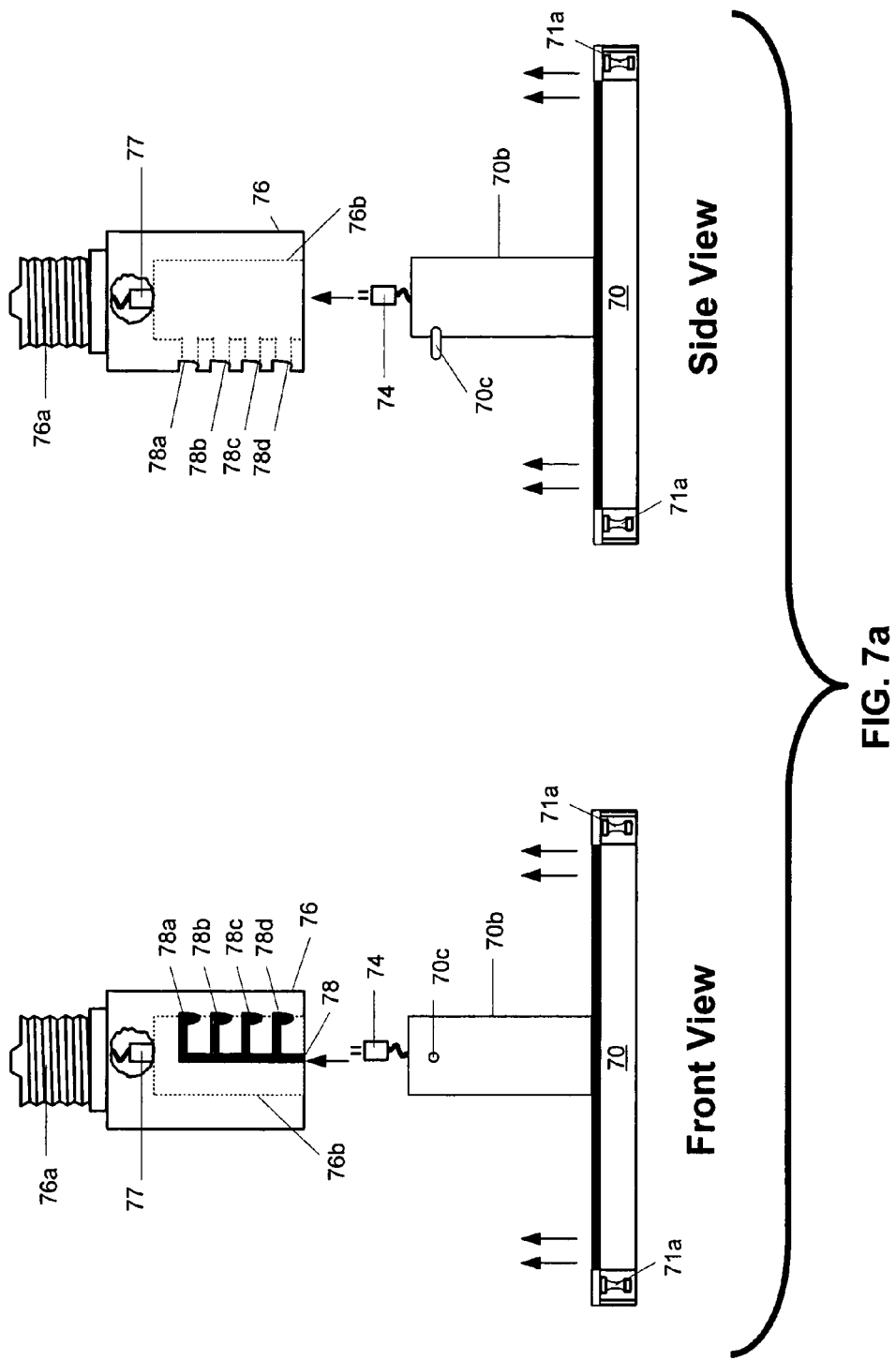

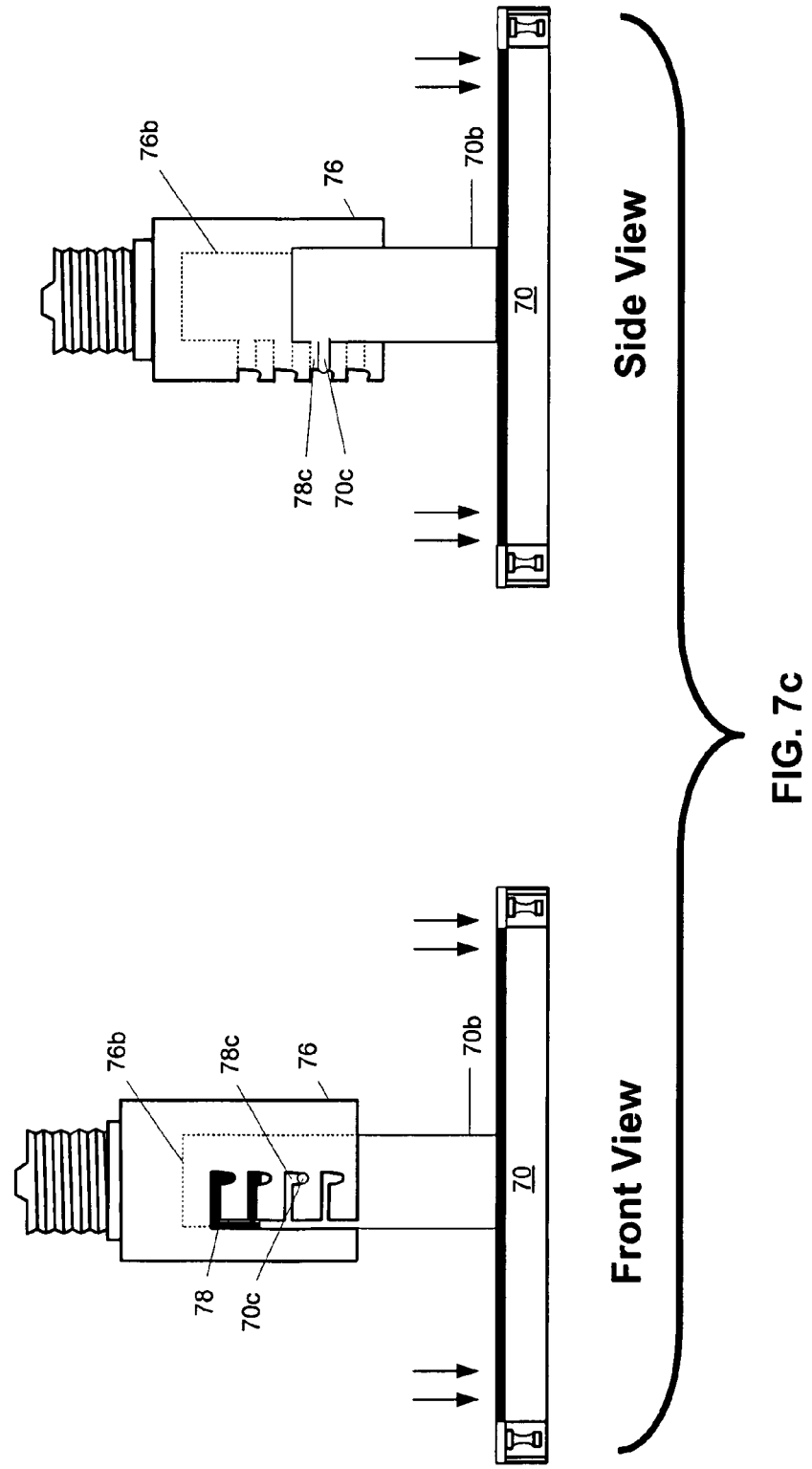

CIRCULAR LED PANEL LIGHT

This invention claims the benefit of the Provisional Patent Application No. 60/880,393 filed with the U.S. Patent and Trademark Office on Jan. 16, 2007, which is hereby incorporated by reference in its entirety.

BACKGROUND OF THE INVENTION

The embodiments of the invention relate to a light emitting diode (LED) lighting device and more particularly, to an LED lighting device for a recessed can lighting system. Although embodiments of the invention are suitable for a wide scope of applications, they are particularly suitable for a light emitting diode panel in a recessed can.

Various lighting devices are used to illuminate interior spaces. These include candelabras, chandeliers, track lighting and recessed cans. The latter are used when the lighting devices are to be hidden from view and otherwise unobtrusive. Most commonly, incandescent lighting is used in recessed cans.

A recent trend in interior lighting is to replace incandescent bulbs with fluorescent bulbs. Fluorescent bulbs are advantageous over incandescent bulbs primarily because of their greater longevity and higher efficiency. In many cases, fluorescent bulbs can increase operating efficiencies several-fold without substantially sacrificing brightness, lighting quality or color. Fluorescent bulbs are used in recessed lighting devices as well with the same advantages.

Interior lighting based on the use of light emitting diode (LED) technology is still relatively new. Light emitting diode technology provides lighting capabilities at far greater efficiency than are even provided by fluorescent bulbs. Recent improvements have raised the brightness and lighting quality of light emitting diode light fixtures up to the standards of incandescent bulbs. However, light emitting diodes in the light emitting diode lighting panels used in lighting devices of various types are susceptible to overheating. When overheating occurs, the efficiency and lifetime of the light emitting diodes is decreased. In some cases, overheating may lead to either catastrophic failure in the LEDs and/or create safety hazards.

SUMMARY OF THE INVENTION

Accordingly, embodiments of the invention are directed to an LED lighting device that substantially obviates one or more of the problems due to limitations and disadvantages of the related art.

An object of embodiments of the invention is to provide an LED lighting device with light emitting diodes arranged at the periphery of the LED lighting device.

Another object of embodiments of the invention is to provide an LED lighting device with a flexible attachment piece that attaches the LED lighting device to a power supply.

Another object of embodiments of the invention is to provide an LED lighting device for insertion into a can wherein the light emitting diode panel of the LED lighting device is positioned outside of the can when the LED lighting device has been inserted into a recessed can.

Additional features and advantages of embodiments of the invention will be set forth in the description which follows, and in part will be apparent from the description, or is learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, the lighting device includes: a light emitting diode lighting panel having first and second opposing surfaces; light emitting diodes at a periphery of light emitting diode lighting panel for emitting light through the first surface; a reflective surface at the second surface of the light emitting diode lighting panel; and a power supply unit connected to the light emitting diode panel, the power supply having first and second ends, and electrical circuitry for converting alternating current to direct current between the first and second ends, wherein the first end is for insertion into the a socket.

In another aspect, the lighting device includes: a light emitting diode lighting panel having first and second opposing surfaces; light emitting diodes arranged at a periphery of the light emitting diode lighting panel for emitting light through the first surface; a reflective surface on the second surface of the light emitting diode lighting panel; a power supply unit for the light emitting diode panel containing electrical circuitry for converting alternating current to direct current, and the power supply unit having first and second ends; and a flexible attachment piece attached to the second end of the power supply for redirecting the light emitting diode lighting panel.

In another aspect, the lighting device includes: a light emitting diode lighting panel having first and second opposing surfaces; light emitting diodes arranged at a periphery of the first surface of the light emitting diode lighting panel for emitting light through the first surface; a reflective surface on the second surface of the light emitting diode lighting panel; and a power supply unit for the light emitting diode panel containing electrical circuitry to convert alternating current to direct current, and the power supply unit having first and second ends, wherein: the first end of the power supply has a first cross-sectional width and fits into a socket for one of an incandescent and fluorescent light bulb, and the light emitting diode panel has a second width greater than four times the first cross-sectional width of the first end of the power supply.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 1b shows a side view of the circular LED panel light of FIG. 1a;

FIG. 2b shows an assembled view of the circular LED panel and power supply of FIG. 2a;

FIG. 3b shows an assembled view of the circular LED panel and power supply of FIG. 3a;

FIG. 3c shows clockwise redirection of the assembled circular LED panel and power supply of FIG. 3a;

FIG. 3d shows counter clockwise redirection of the assembled circular LED panel and power supply of FIG. 3a;

FIG. 4b shows an assembled view of the oversized circular LED panel, power supply and for a recessed lighting can of FIG. 4a;

FIG. 5b shows an assembled view of the oversized, convex circular LED panel and power supply of FIG. 5a;

FIG. 7a shows a front and a side view of a first step in the assembly of an adjustable height circular LED panel light to an adjustable height circular LED panel light accepting power supply;

FIG. 7c shows a front and a side view of a third step in the assembly of an adjustable height circular LED panel light to an adjustable height circular LED panel light accepting power supply;

DETAILED DESCRIPTION OF THE PREFERRED EMBODIMENTS

Figure 1A:
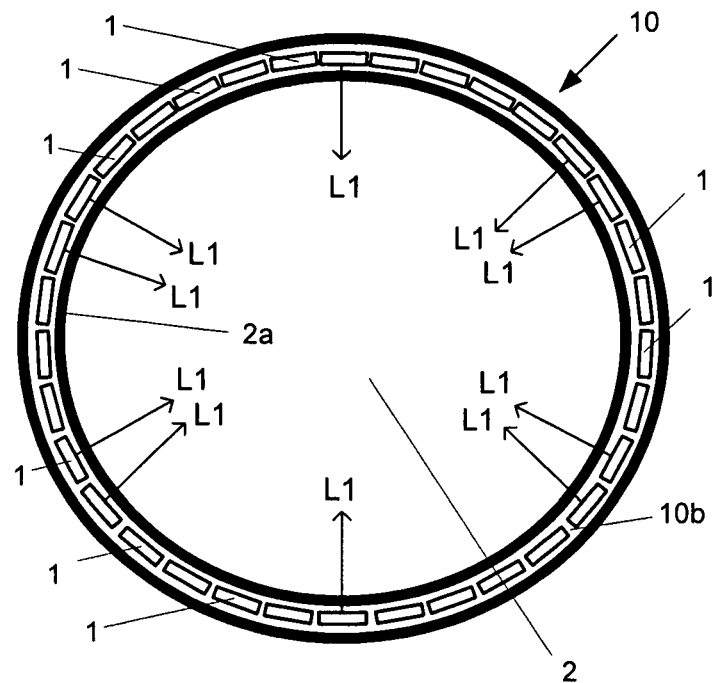
FIG. 1a shows a bottom view of a circular LED panel light.

Reference will now be made in detail to the preferred embodiments of the invention, examples of which are illustrated in the accompanying drawings. It will be apparent to those skilled in the art that various modifications and variations is made in the embodiments of the invention, the recessed can lighting device, without departing from its spirit or scope. Thus, it is intended that embodiments of the invention cover the modifications and variations of this invention provided they come within the scope of the appended claims and their equivalents. In the drawings, the thicknesses of layers and regions are exaggerated for clarity. Like reference numerals in the drawings denote like elements.

Installation of light emitting diode panels in recessed lighting devices typically requires for either redesign and modification of existing fixtures or the design of entirely new fixtures. Thus, a recessed lighting device with a light emitting diode panel that operates in recessed lighting devices made for incandescent or fluorescent bulbs without excessive modification to the fixtures is an easier alternative. A recessed lighting device having a light emitting diode panel that allows sufficient ventilation for the light emitting diodes of the panel and the circuitry that regulates the power delivered to the light emitting diodes extends the operational life of the light emitting diode.

Figure 1B:
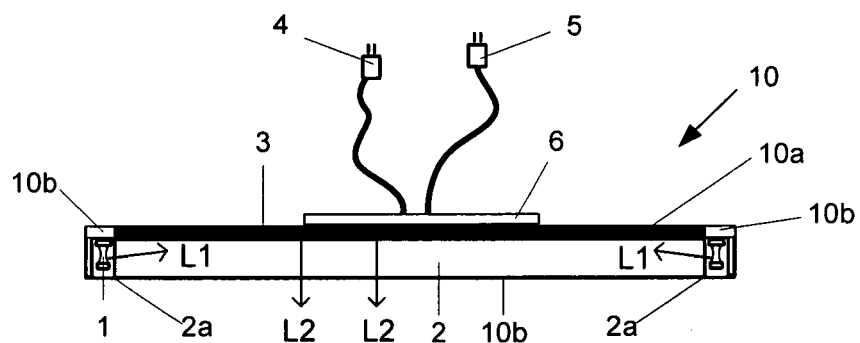

FIG. 1a shows a bottom view of a circular LED panel light. FIG. 1b shows a side view of the circular LED panel light of FIG. 1a. The circular LED panel 10 is circular or disk shaped, as shown in FIG. 1a, or is one of a number of other shapes, such as that of an ellipse, polygon or annulus and has a top surface 10a. The circular LED panel 10 of FIG. 1a is created by wrapping a disk-shaped light guide panel 2 with a strip 10b of light emitting diodes 1. Alternatively, the circular LED panel 10 and light emitting diodes 1 may be one monolithic piece (not shown).

The light guide panel 2 is made from one of transparent and partially transparent polymers. As shown in FIG. 1a and FIG. 1b, the light emitting diodes 1 emit light L1 that enters the light guide panel 2 at its edge 2a in a radially inward direction.

As shown in FIG. 1b, a top surface 10a of the circular LED panel 10 has a mirrored edge 3 that reflects light L1 emitted by the light emitting diodes 1 of the circular LED panel 10. The mirrored edge 3 is a metallic or reflective layer that is separate from the light guide panel 2. Alternatively, the mirrored edge 3 is a coating of the light guide panel 2 with a reflective material such as a metal. The mirrored edge 3 is completely opaque and reflective to the light L emitted by the light emitting diodes 1. Alternatively, the mirrored edge 3 is partially transmissive and partially reflective to the light L1 emitted by the light emitting diodes 1. As shown in FIG. 1b, light L1 emitted by the light emitting diodes 1 is reflected from the mirrored edge 3 leaves the circular LED panel 10 through the bottom surface 10b of the circular LED panel 10 to provide light L2 below the circular LED panel 10.

As shown in FIG. 1b, the circular LED panel 10 has connectors 4 and 5 for connecting the circular LED panel 10 to a power source (not shown). The circular LED panel 10 may have two connectors 4 and 5, as shown in FIG. 1b, or it may have one, three or more connectors. The connectors 4 and 5 of the circular LED panel 10 are connected to the circular LED panel 10 via a flexible wire as shown in FIG. 1b, or the connectors 4 and 5 of the circular LED panel 10 are connected to the circular LED panel 10 via another type of interconnection, such as an inflexible wire, flexible or inflexible ribbon, flexible or inflexible post (not shown). As shown in FIG. 1b, the circular LED panel 10 may also have a lip 6 for snap attaching the circular LED panel 10 to another device.

Figure 1C:
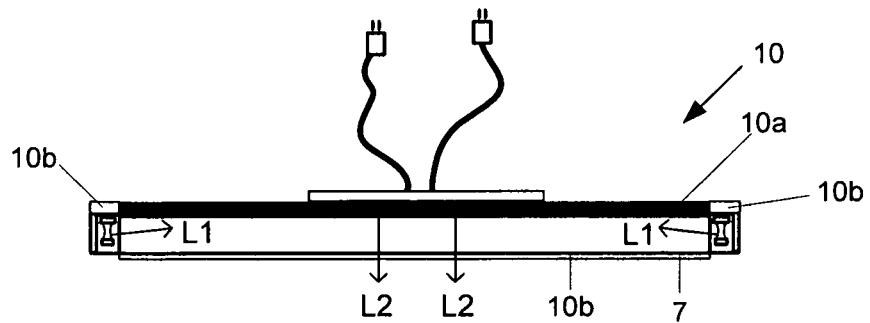
FIG. 1c shows a side view of the circular LED panel light of FIG. 1a with a lens.

FIG. 1c shows a side view of the circular LED panel of FIG. 1a with a lens. The lens 7 disperses the light L2 exiting the circular LED panel 10 as it exits the circular LED panel through the bottom surface 10b of the circular LED panel 10. The lens 7 distributes the light L2 emitted by the circular LED panel 10 to light interior spaces more efficiently. In the alternative, the lens 7 also includes reflective surfaces to increase the refraction of redirected light, or to redirect light to specific targets. In another alternative, the lens 7 has more than one lens for both focusing and dispersion of the light created by the circular LED panel 10. In yet another alternative, the lens 7 further includes one or several optical elements (not shown), such as light guide panels, convex or concave lenses, filters, parabolic, flat mirrors, shaped-mirrors, polarizers or light blocking devices (not shown).

Figure 2A:
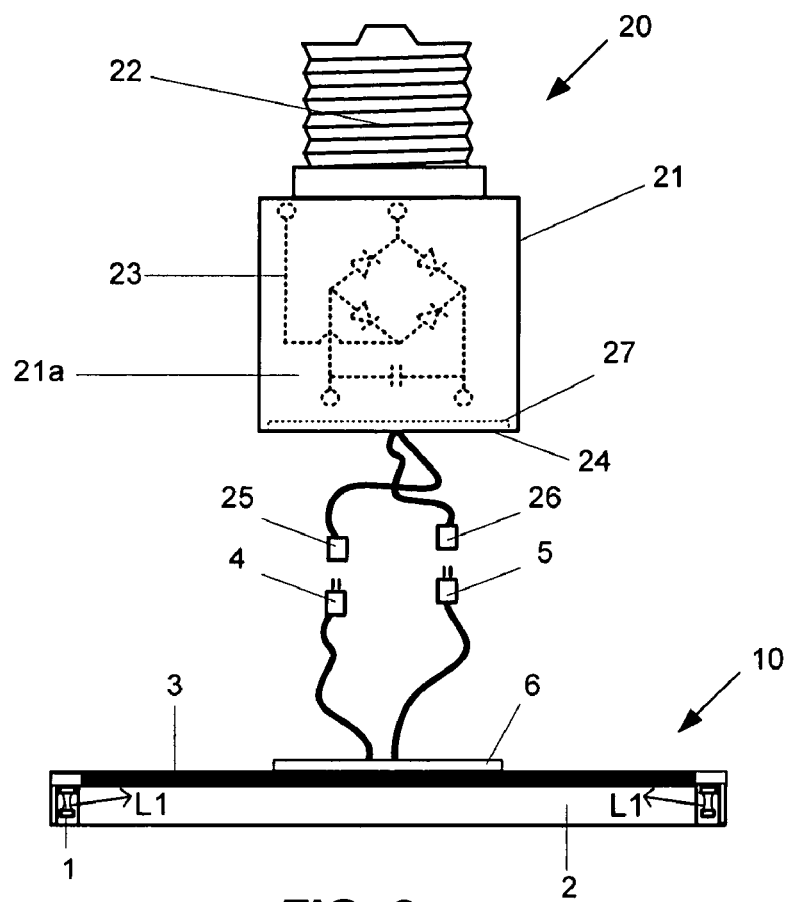
FIG. 2a shows the assembly of a circular LED panel of FIG. 1a and a power supply.
Figure 2B:
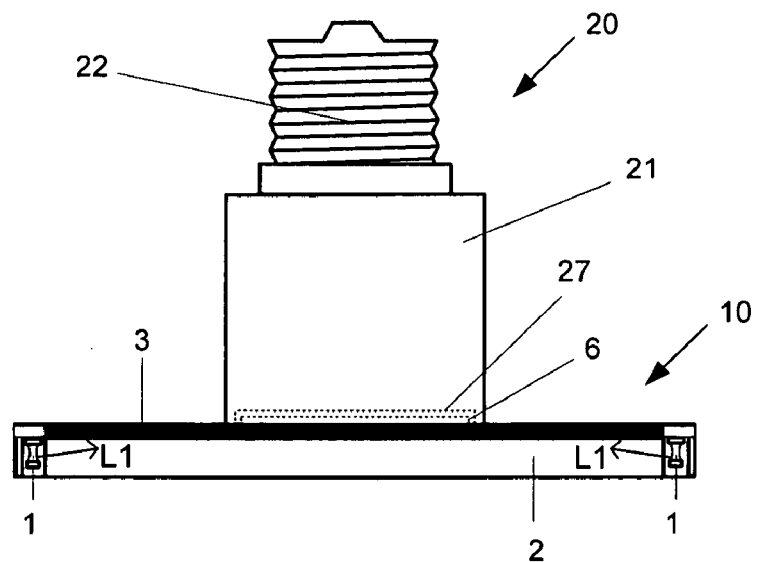

FIG. 2a shows the assembly of a circular LED panel of FIG. 1a and a power supply. FIG. 2b shows an assembled view of the circular LED panel and power supply of FIG. 2a. The power supply 20 has an input end 22, a main body 30 and output end 24 having connectors 25 and 26. As shown in FIG. 2a, the power supply 20 has an input end 22 for insertion into a socket, (not shown) which also accepts a fluorescent or an incandescent light bulb. Alternatively, the input end 22 of the power supply 20 may contain wires or connectors (not shown) enabling it to connect directly to a power line. Alternatively, the input end 22 of the power supply 20 may contain one of a number of other types of connectors, such as alligator clips, pins or snap fasteners (not shown), that enable the power supply 20 to draw power from external sources such as an outlet or a main power line.

The main body 31 of the power supply 30 contains an AC/DC converter 23, a transformer (not shown) and other power conversion devices (not shown). The AC/DC converter 23 is one of a number of different circuits including a diode bridge, bridge rectifier, as shown in FIG. 2a, or other power control circuitry. The AC/DC converter 23 may also contain other elements and circuits (not shown) for power regulation, heat dissipation or other uses.

The connectors 4 and 5 of the circular LED panel 10 and the connectors 25 and 26 of the power supply 20 are reversibly connectable, as shown in FIG. 2a. Alternatively, the connectors 4 and 5 of the circular LED panel 10 and the connectors 25 and 26 of the power supply 20 are permanently connected. The connectors 4 and 5 of the circular LED panel 10 and the connectors 25 and 26 of the power supply 20 are reversibly connectable using a plug and a socket, as shown in FIG. 2a, or pins and sockets, tabs and slits and other types of reversible connectors (not shown). The connectors 25 and 26 of the power supply 20 are connected to the power supply 20 via a flexible wire as shown in FIG. 2a, or in the alternative, the connectors 25 and 26 of the power supply 20 are connected to the power supply 20 via another type of interconnection, such as an inflexible wire, flexible or inflexible ribbon, flexible or inflexible post (not shown).

Because the connectors 4 and 5 of the circular LED panel 10 and the connector 25 and 26 of the power supply 20 are reversibly connectable, either component is independently replaceable. In particular, disconnecting the connectors 25 and 26 from the connectors 4 and 5 allows one of the circular LED panel 10 and the power supply 20 to be removed without having to remove the other component. This is useful since the lifetimes of the circular LED panel 10 and the power supply 20 differ so as to result in the need to replace one of these components more often than the other. For example, the electronics associated with the power supply 20 could be more prone to overheating and subject to short circuiting and burn-out. Reversibility of the connectors 25 and 26 from the connectors 4 and 5 allows the replacement of either the circular LED panel 10 or the power supply 20 as needed. Additionally, the reversibility of connectors 25 and 26 from the connectors 4 and 5 allows quick removal and repair of either the power supply 20 or the circular LED panel 10.

As shown in FIG. 2b, assembling the circular LED panel 10 to the power supply 20 hides the connectors 4, 5, 25 and 26 from view by covering them with the exterior of the power supply 20. Alternatively, the connectors 4, 5, 25 and 26 are exposed after the circular LED panel 10 has been assembled to the power supply 20 or the connectors 4, 5, 25 and 26 fit in a depression or recessed portion (not shown) of the circular LED panel 10.

As shown in FIGS. 2a and 2b, the circular LED panel 10 also has a lip 6 and the power supply 20 has a corresponding lip receiving portion 27 both of which are used to attach the circular LED panel 10 to the power supply 20. As shown in FIG. 2a, in assembly the circular LED panel 10 is attached to the power supply 20 by placing the lip 6 of the circular LED panel 10 inside the lip receiving portion 27 of the power supply 20. Upon assembly, as shown in FIG. 2b, the lip 6 of the circular LED panel 10 is contained within the lip accepting portion 27 of the power supply 20. The lip 6 of the circular LED panel 10 may snap-fasten to the lip receiving portion 27 of the power supply 20. Alternatively, the lip 6 of the circular LED panel 10 and the lip receiving portion 27 of the power supply 20 may be threaded (not shown) such that the lip 6 and the lip receiving portion 27 are placed into contact and rotated until the circular LED panel 10 is attached to the power supply 20. Alternatively, the circular LED panel 10 is attached to the power supply 20 by one of a number of other methods that include pins, pinch pins, clasps, tabs, bolts or other attaching mechanisms (not shown).

Figure 3A:
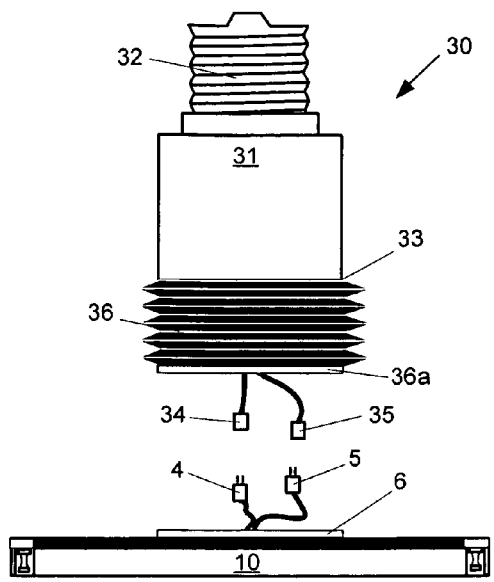
FIG. 3a shows the assembly of the circular LED panel of FIG. 1a and a power supply with a flexible attachment piece.
Figure 3B:
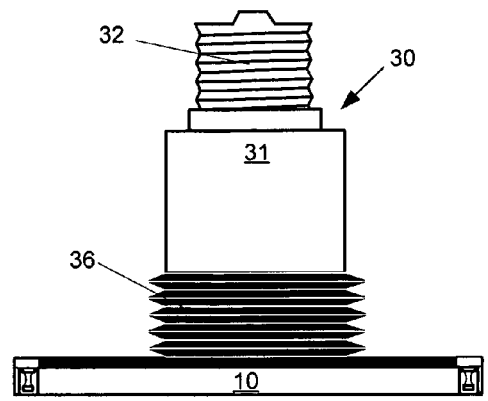

FIG. 3a shows the assembly of the circular LED panel of FIG. 1a and a power supply with a flexible attachment piece. FIG. 3b shows an assembled view of the circular LED panel and power supply of FIG. 3a.

The power supply 30 has an input end 32, a main body 31 and an output end 33 having connectors 34 and 35 extending through a flexible attachment piece 36. As shown in FIG. 3a, the power supply 30 has a main body portion 31 that is attached to an end 32. The end 32 of the power supply 30 for insertion into a socket (not shown) that also accepts a fluorescent or an incandescent light bulb. Alternatively, the end 32 of the power supply 30 can contain wires or connectors (not shown) enabling it to connect directly to a power line. In another alternative, the end 32 of the power supply 30 contains one of a number of other connectors, such as alligator clips, pins or snap fasteners (not shown), that enable the power supply 30 to draw power from external sources, such as an outlet or a main power line.

The main body 31 of the power supply 30 contains an AC/DC converter (not shown), a transformer (not shown) and other power conversion devices (not shown). The AC/DC converter is one of a number of different circuits including a diode bridge, bridge rectifier or other types of power control circuitry. The AC/DC converter may also contain other elements and circuits (not shown) for power regulation, heat dissipation or other uses.

The connectors 4 and 5 of the circular LED panel 10 and the connectors 34 and 35 of the power supply 30 are reversibly connectable, as shown in FIG. 3a. Alternatively, the connectors 4 and 5 of the circular LED panel 10 and the connectors 34 and 35 of the power supply 30 are permanently connected. The connectors 4 and 5 of the circular LED panel 10 and the connectors 34 and 35 of the power supply 30 are reversibly connectable using a plug and a socket, as shown in FIG. 3a, or pins and sockets, tabs and slits and other types of reversible connectors (not shown). The connectors 34 and 35 of the power supply 30 are connected to the power supply 30 via a flexible wire as shown in FIG. 3a, or in the alternative, the connectors 34 and 35 of the power supply 30 are connected to the power supply 30 via another type of interconnection, such as an inflexible wire, flexible or inflexible ribbon, flexible or inflexible post (not shown).

Because the connectors 4 and 5 of the circular LED panel 10 and the connector 34 and 35 of the power supply 30 are reversibly connectable, either component is independently replaceable. In particular, disconnecting the connectors 34 and 35 from the connectors 4 and 5 allows one of the circular LED panel 10 and the power supply 30 to be removed without having to remove the other component. This is useful since the lifetimes of the circular LED panel 10 and the power supply 20 differ so as to result in the need to replace one of these components more often than the other. For example, the electronics associated with the power supply 30 could be more prone to overheating and subject to short circuiting and burn-out. Reversibility of the connectors 34 and 35 from the connectors 4 and 5 allows the replacement of either the circular LED panel 10 or the power supply 30 as needed. Additionally, the reversibility of connectors 34 and 35 from the connectors 4 and 5 allows quick removal and repair of either the power supply 30 or the circular LED panel 10.

As shown in FIG. 3a, the output end 33 of the power supply 30 has a flexible attachment piece 36 with a lip receiving portion 36a and the circular LED panel 10 has a corresponding lip 6 which are used to attach the circular LED panel 10 to the power supply 30. As shown in FIG. 3b, in assembling the circular LED panel 10 to the power supply 30 the flexible attachment piece 36 is slipped over the connectors 4, 5, 34 and 35 such that the connectors 4, 5, 34 and 35 are covered by flexible attachment piece 36 and hidden from view. Alternatively, the connectors 4, 5, 34 and 35 fit in a depression or recessed portion (not shown) of the circular LED panel 10.

As shown in FIGS. 3a and 3b, during assembly the circular LED panel 10 is attached to the power supply 30 by placing the lip 6 of the circular LED panel 10 inside the lip receiving portion 36a of the flexible attachment piece 36 of the power supply 30. Once assembled, the lip 6 of the circular LED panel 10 is contained within the lip accepting portion 36a of the power supply 30. The lip 6 of the circular LED panel 10 may snap-fasten to the lip receiving portion 36 of the power supply 20. Alternatively, the lip 6 of the circular LED panel 10 and the lip receiving portion 36a of the power supply 30 may be threaded (not shown) such that the lip 6 and the lip receiving portion 36a are placed into contact and rotated until the circular LED panel 10 is attached to the power supply 30. Alternatively, the circular LED panel 10 is attached to the power supply 20 by one of a number of other methods that include pins, pinch pins, clasps, tabs, bolts or other attaching mechanisms (not shown).

Figure 3C:
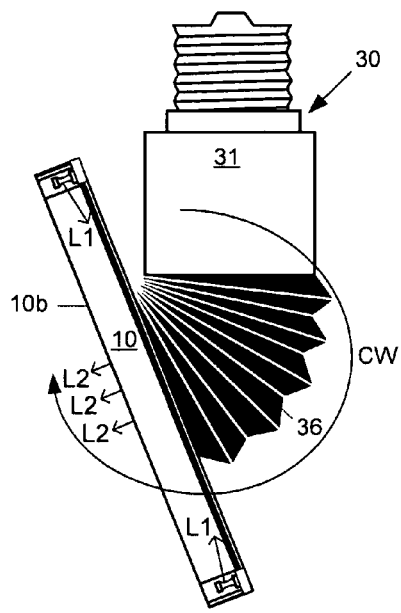
Figure 3D:
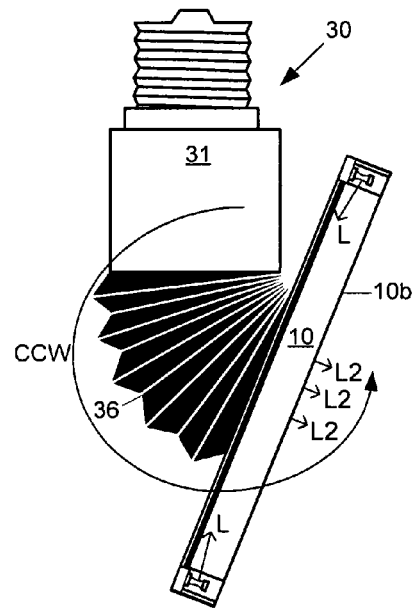

FIG. 3c shows clockwise redirection of the assembled circular LED panel and power supply of FIG. 3a. FIG. 3d shows counter clockwise redirection of the assembled circular LED panel and power supply of FIG. 3a. The flexibility of the flexible attachment piece 36 allows the swiveling motion shown in FIG. 3a and FIG. 3b. The bottom surface 10b of the circular LED panel 10 is swiveled in a CW direction shown in FIG. 3c of more than 45 degrees from its position shown in FIG. 3b. Similarly, the bottom surface 10b of the circular LED panel 10 is swiveled in a CCW direction shown in FIG. 3d of more than 45 degrees from its position shown in FIG. 3b. Swiveling along either the CW direction shown in FIG. 3c or the CCW direction shown in FIG. 3d allows the light L2 emitted through the bottom surface 10b of the circular LED panel 10 to be redirected as needed.

For example, light L2 emitted through the bottom surface 10b of the circular LED panel 10 that has been redirected using the flexible attachment piece 36, as shown in FIG. 3c or FIG. 3d, is directed to provide supplemental illumination objects on display such as paintings, sculpture or photographs. Light L2 emitted through the bottom surface 10b of the circular LED panel 10 that has been redirected using the flexible attachment piece 36 can also be directed to provide supplemental illumination to fixtures such as doorways, fireplaces and footpaths. Light L2 emitted through the bottom surface 10b of the circular LED panel 10 that has been redirected using the flexible attachment piece 36 can also be directed to provide supplemental illumination to a study or work area. Light L2 emitted through the bottom surface 10b of a series of circular LED panels 10 and power supplies 30 may also be redirected using the flexible attachment pieces 36 associated with each power supply 30 to provide supplemental illumination as needed.

Figure 4A:
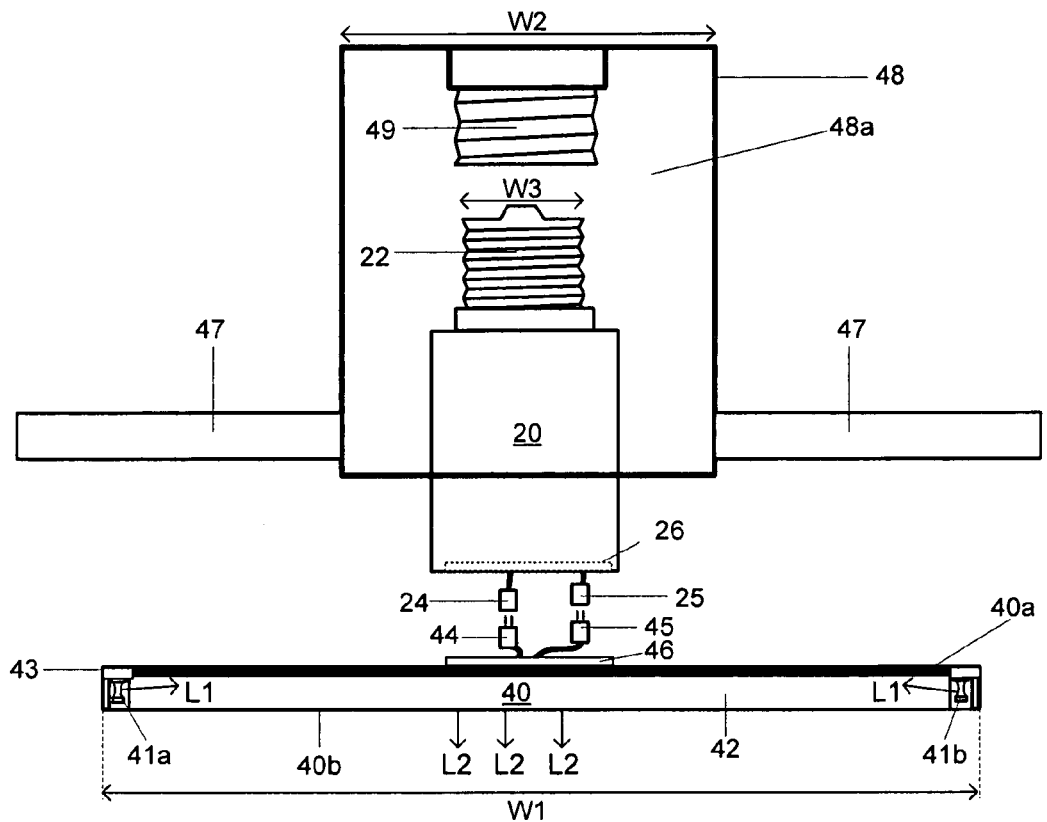
FIG. 4a shows the assembly of an oversized circular LED panel and a power supply for a recessed lighting can.
Figure 4B:
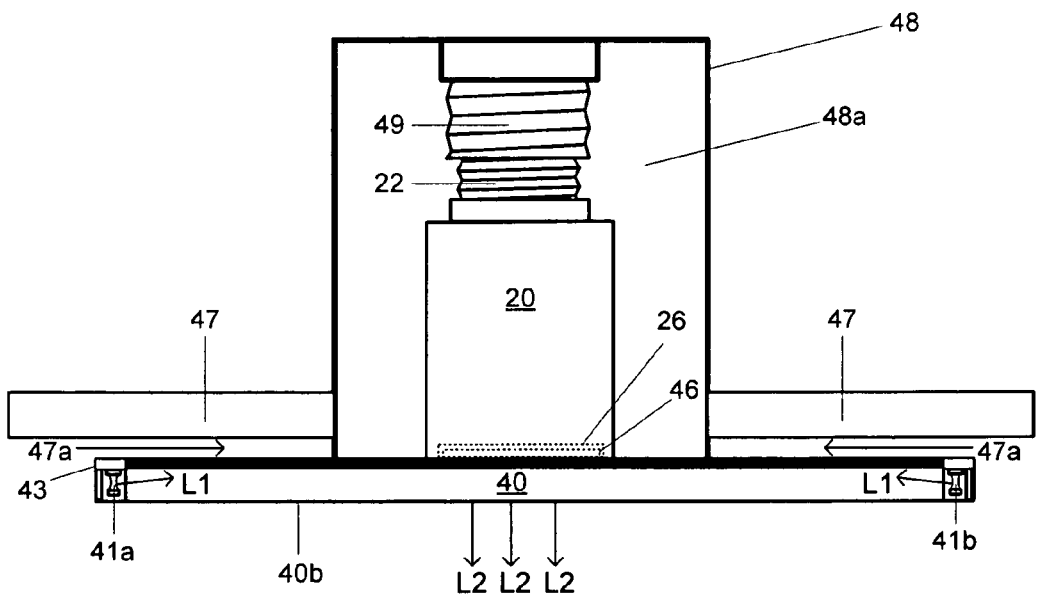

FIG. 4a shows the assembly of an oversized circular LED panel and a power supply for a recessed lighting can. FIG. 4b shows an assembled view of the oversized circular LED panel, power supply and for a recessed lighting can of FIG. 4a. As shown in FIG. 4a, the width W1 of the oversized circular LED panel 40 is larger than the width W2 of the can 48. The width W2 of the oversized circular LED panel is four or more times larger than the width W3 of the input end 22.

The oversized circular LED panel 40 is circular or disk shaped, as shown in FIG. 4a and FIG. 4b, or it may have one of a number of other shapes such as that of an ellipse, polygon or annulus. The circumference of the oversized circular LED panel 40 is lined with light emitting diodes 41a and 41b and other light emitting diodes 41 (not shown), while the interior of the oversized circular LED panel 40 contains a light guide panel 52. The light guide panel 42 is made from of transparent and partially transparent polymers. As shown in FIG. 4a and FIG. 4b, the light emitting diodes 41 emit light L1 that enters the light guide panel 42 at its edge 42a in a radially inward direction.

As shown in FIG. 4a and FIG. 4b, a top surface 40a of the oversized circular LED panel 40 has a mirrored edge 43 that reflects light L1 emitted by the light emitting diodes 41a and 41b, and other light emitting diodes 41 (not shown) of the oversized circular LED panel 40. The mirrored edge 43 is a metallic or reflective layer that is separate from the light guide panel 42. Alternatively, the mirrored edge 43 is a coating of the light guide panel 42 with a reflective material such as a metal. The mirrored edge 43 is completely opaque and reflective to the light L1 emitted by the light emitting diodes 41a, 41b and other light emitting diodes 41 (not shown). Alternatively, the mirrored edge 3 is partially transmissive to the light L1 emitted by the light emitting diodes 41a and 41b, and other light emitting diodes 41 (not shown). As shown in FIG. 4a and FIG. 4b, light L1 emitted by the light emitting diodes 41a and 41b, and other light emitting diodes 41 (not shown) and reflected from the mirrored edge 43 leaves the oversized circular LED panel 40 through the bottom surface 40b of the oversized circular LED panel 40 to provide light L2 below the oversized circular LED panel 40.

As shown in FIG. 4a, the oversized circular LED panel 40 has connectors 44 and 45 for connecting the oversized circular LED panel 40 to a power source. The oversized circular LED panel 40 may have two connectors 44 and 45, as shown in FIG. 4a, or it may have one, three or more connectors. The connectors 44 and 45 of the oversized circular LED panel 40 are connected to the oversized circular LED panel 40 via a flexible wire as shown in FIG. 4a, or the connectors 4 and 5 of the oversized circular LED panel 40 are connected to the oversized circular LED panel 40 via another type of interconnection, such as an inflexible wire, flexible or inflexible ribbon, flexible or inflexible post (not shown). As shown in FIG. 4a, the oversized circular LED panel 40 can also have a lip 46 for snap attaching the oversized circular LED panel 40 to another device.

The can 48 is affixed to the ceiling 47 using one of a number of methods that include the use of affixing tabs (not shown). The can 47 is cylindrically shaped, as shown in FIG. 4a and FIG. 4b. Alternatively, the can 47 has one of a number of different shapes including that of a rectangular prism or a prism with a triangular cross section. Alternatively, the can 47 has a spherical, semi-spherical, a shape with a circular cross section or other shape. The can 47 is made from metal, plastic or a combination thereof. The can 47 is solid and seamless. Alternatively, the can 31 can has seams, holes or ancillary cavities (not shown).

The can 48 includes a socket 49 for supplying power to the oversized circular LED panel 40 through the power supply 20 received into the socket 49. The socket 49 may alternatively receive an incandescent light bulb (not shown) or a fluorescent light bulb (not shown). The power supply 20 is electrically connected to the socket 49 by inserting it into the socket 49 as shown in FIG. 4a and FIG. 4b. The oversized circular LED panel 40 is connected to the power supply 20 by connecting the connectors 44 and 55 of the oversized circular LED panel 40 to the connectors 24 and 25 of the power supply 20. The connectors 44 and 55 of the oversized circular LED panel 40 and the connector 24 and 25 of the power supply 20 are reversibly connectable, as shown in FIG. 4a. Alternatively, the connectors 44 and 55 of the oversized circular LED panel 40 and the connector 24 and 25 of the power supply 20 are permanently connected.

When the oversized circular LED panel 40 and power supply 20 are not installed in the can 48, a light bulb (not shown) could be inserted into the socket 49 so as to provide electrical power to the light bulb (not shown). The socket 49 is typically either a single bulb socket, as shown in FIG. 4a, or is a multiple socket for multiple bulbs (not shown). In another alternative, the socket 49 has other features, such as an outlet (not shown), for supplying power to electronic devices (not shown) or additional connections, including wires (not shown), additional sockets (not shown) or pin connects (not shown).

The width W1 of the oversized circular LED panel 40 is large enough to provide sufficient distance between light emitting diodes 41a and 41b, and other light emitting diodes (not shown), on opposite edges of the oversized circular LED panel 40 from causing each other to overheat. In other words, the width W1 of the oversized circular LED panel 40 is large enough to prevent convection or thermal radiation from light emitting diodes 41a and 41b on opposite edges of the oversized circular LED panel 40 from reaching each other. Keeping the light emitting diodes 41a and 41b on opposite edges of the oversized circular LED panel 40 relatively cool increases the lifetime of each of the light emitting diodes 41a, 41b and other light emitting diodes 41 (not shown) of the oversized circular LED panel 40. Further, the width W1 of the oversized circular LED panel 40 is large enough to prevent convection or thermal radiation from light emitting diodes 41 from entering the interior 48a of the can 48.

Ventilation from the air passages 47a between the oversized circular LED panel 40 and the ceiling 47 cools the light emitting diodes 41a, 41b and other light emitting diodes 41 (not shown) and keeps the heat given off by the light emitting diodes 41a, 41b and other light emitting diodes 41 (not shown) from affecting the power supply 20. Both the oversized circular LED panel 40 and the power supply 20 can heat, during normal operation, to temperatures that could degrade the operating efficiency or the lifetime of the power supply 20 and oversized circular LED panel 40. Cooling due to ventilation created by air passages 47a prolongs the lifetime of the power supply 20 and the oversized circular LED panel 40.

Figure 5A:
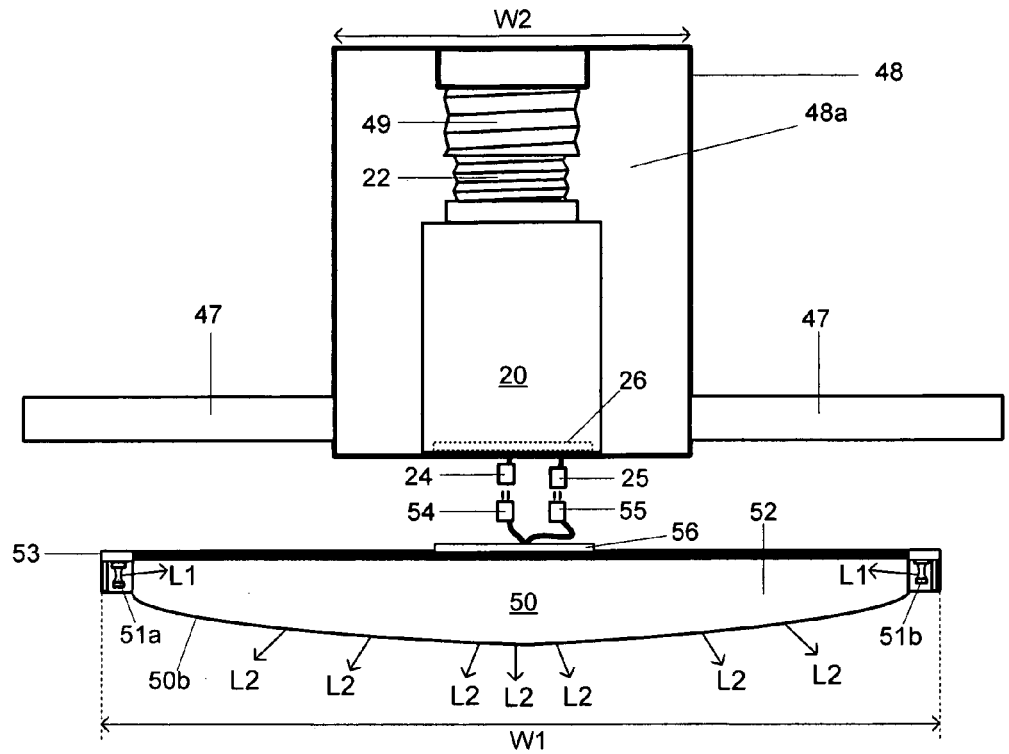
FIG. 5a shows the assembly of an oversized, convex circular LED panel and a power supply.
Figure 5B:
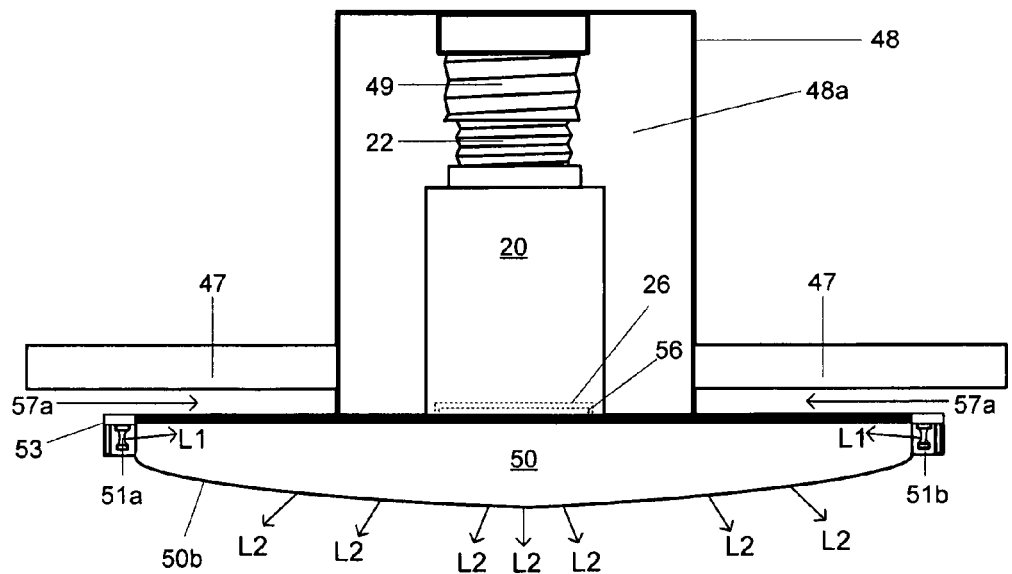

FIG. 5a shows the assembly of an oversized convex circular LED panel and a power supply. FIG. 5b shows an assembled view of the oversized convex circular LED panel and power supply of FIG. 5a.

The oversized convex circular LED panel 50 is circular or disk shaped, as shown in FIG. 5a and FIG. 5b, or it may have one of a number of other shapes, such as that of an ellipse, polygon or annulus. The circumference of the oversized convex circular LED panel 50 is lined with light emitting diodes 51a, 51b and other light emitting diodes 51 (not shown) while the interior of the oversized convex circular LED panel 50 contains a light guide panel 52. The light guide panel 52 is made from of transparent and partially transparent polymers. As shown in FIG. 5a and FIG. 5b, the light emitting diodes 51a, 51b and other light emitting diodes 51 (not shown) emit light L1 that enters the light guide panel 52 at its edge 52a in a radially inward direction.

As shown in FIG. 5a and FIG. 5b, a top surface 50a of the oversized convex circular LED panel 50 has a mirrored edge 53 that reflects light L emitted by the light emitting diodes 51a and 51b, and other light emitting diodes 51 (not shown) of the oversized convex circular LED panel 50. The mirrored edge 53 is a metallic or reflective layer that is separate from the light guide panel 52. Alternatively, the mirrored edge 53 is a coating of the light guide panel 52 with a reflective material, such as a metal. The mirrored edge 53 is completely opaque and reflective to the light L emitted by the light emitting diodes 51a and 51b, and other light emitting diodes 51 (not shown). Alternatively, the mirrored edge 53 is partially transmissive to the light L emitted by the light emitting diodes 51a, 51b and other light emitting diodes 51 (not shown). As shown in FIG. 5a and FIG. 5b, light L1 emitted by the light emitting diodes 51a and 51b, and other light emitting diodes 51 (not shown) and reflected from the mirrored edge 53 leaves the oversized convex circular LED panel 50 through the bottom surface 50b of the oversized convex circular LED panel 50 to provide light L2 below the oversized convex circular LED panel 50.

As shown in FIG. 5a, the bottom edge 50b of the oversized convex circular LED panel 50 has a convex shape. The convex shape of the bottom edge 50b of the oversized convex circular LED panel 50 tends to cause dispersion of the light L2 exiting the oversized convex circular LED panel 50 from the bottom edge 50b, as shown in FIG. 5b. Dispersing the light L2 exiting the bottom edge 50b of the oversized convex circular LED panel 50, as shown in FIG. 5a and FIG. 5b, provides more diffuse and pleasant lighting. Further, using the oversized convex circular LED panel 50 provides more even lighting to larger spaces, such as rooms or entry ways. In addition, the oversized convex circular LED panel 50 has a lighting effect closer to that of an incandescent bulb.

As shown in FIG. 5a, the oversized convex circular LED panel 50 has connectors 54 and 55 for connecting the oversized convex circular LED panel 50 to a power source. The oversized convex circular LED panel 50 may have two connectors 54 and 55, as shown in FIG. 5a, or it may have one, three or more connectors. The connectors 54 and 55 of the oversized convex circular LED panel 50 are connected to the oversized convex circular LED panel 50 via a flexible wire as shown in FIG. 5a, or the connectors 4 and 5 of the oversized convex circular LED panel 50 are connected to the oversized convex circular LED panel 50 via another type of interconnection, such as an inflexible wire, flexible or inflexible ribbon, flexible or inflexible post (not shown). As shown in FIG. 5a, the oversized convex circular LED panel 50 may also have a lip 56 for snap attaching the oversized convex circular LED panel 50 to another device.

The can 48 is affixed to the ceiling 47 using one of a number of methods that include the use of affixing tabs (not shown). The can 47 is cylindrically shaped, as shown in FIG. 5a and FIG. 5b. Alternatively, the can 47 has one of a number of different shapes including that of a rectangular prism or a prism with a triangular cross section. Alternatively, the can 47 has a spherical, semi-spherical, a shape with a circular cross section or other shape. The can 47 is made from metal, plastic or a combination thereof. The can 47 is solid and seamless. Alternatively, the can 31 can has seams, holes or ancillary cavities (not shown).

The can 48 includes a socket 49 for supplying power to the oversized convex circular LED panel 50 through the power supply 20. The socket 49 may alternatively receive an incandescent light bulb (not shown) or a fluorescent light bulb (not shown). The power supply 20 is electrically connected to the socket 49 by inserting it into the socket 49 as shown in FIG. 5a and FIG. 5b. The oversized convex circular LED panel 50 is connected to the power supply 20 by connecting the connectors 54 and 55 of the oversized convex circular LED panel 50 to the connectors 24 and 25 of the power supply 20. The connectors 44 and 55 of the oversized convex circular LED panel 50 and the connector 24 and 25 of the power supply 20 are reversibly connectable, as shown in FIG. 5a. Alternatively, the connectors 44 and 55 of the oversized convex circular LED panel 50 and the connector 24 and 25 of the power supply 20 are permanently connected.

When the oversized convex circular LED panel 50 and power supply 20 are not installed in the can 48, a light bulb (not shown) could be inserted into the socket 49 so as to provide electrical power to the light bulb (not shown). The socket 49 is typically either a single bulb socket, as shown in FIG. 5a, or is a multiple socket for multiple bulbs (not shown). In another alternative, the socket 49 has other features such as an outlet (not shown) for supplying power to electronic devices (not shown) or additional connections including wires (not shown), additional sockets (not shown) or pin connects (not shown).

As shown in FIG. 5a, the width W1 of the oversized convex circular LED panel 50 is larger than the width W2 of the can 48. The width W1 of the oversized convex circular LED panel 50 is large enough to provide sufficient distance between light emitting diodes 51a and 51b, and other light emitting diodes 51 (not shown), on opposite edges of the oversized convex circular LED panel 50 from causing each other to overheat. In other words, the width W1 of the oversized convex circular LED panel 50 is large enough to prevent convection or thermal radiation from light emitting diodes 51a and 51b, and other light emitting diodes 51 (not shown), on opposite edges of the oversized convex circular LED panel 50 from reaching each other. Keeping the light emitting diodes 51a and 51b, other light emitting diodes 51 (not shown), on opposite edges of the oversized convex circular LED panel 50 relatively cool increases the lifetime of each light emitting diodes 51a, 51b and other light emitting diodes 51 (not shown) of the oversized convex circular LED panel 50. Further, the width W1 of the oversized convex circular LED panel 50 is large enough to prevent convection or thermal radiation from light emitting diodes 51 from entering the interior 48a of the can 48.

Ventilation from the air passages 47a between the oversized convex circular LED panel 50 and the ceiling 47 cools the light emitting diodes 51 and keeps the heat given off by the light emitting diodes 51 from affecting the power supply 20. Both the oversized convex circular LED panel 50 and the power supply 20 can heat, during normal operation, to temperatures that could degrade the operating efficiency or the lifetime of the power supply 20 and oversized convex circular LED panel 50. Cooling due to ventilation created by air passages 47a prolongs the lifetime of the power supply 20 and the oversized convex circular LED panel 50.

Figure 6:
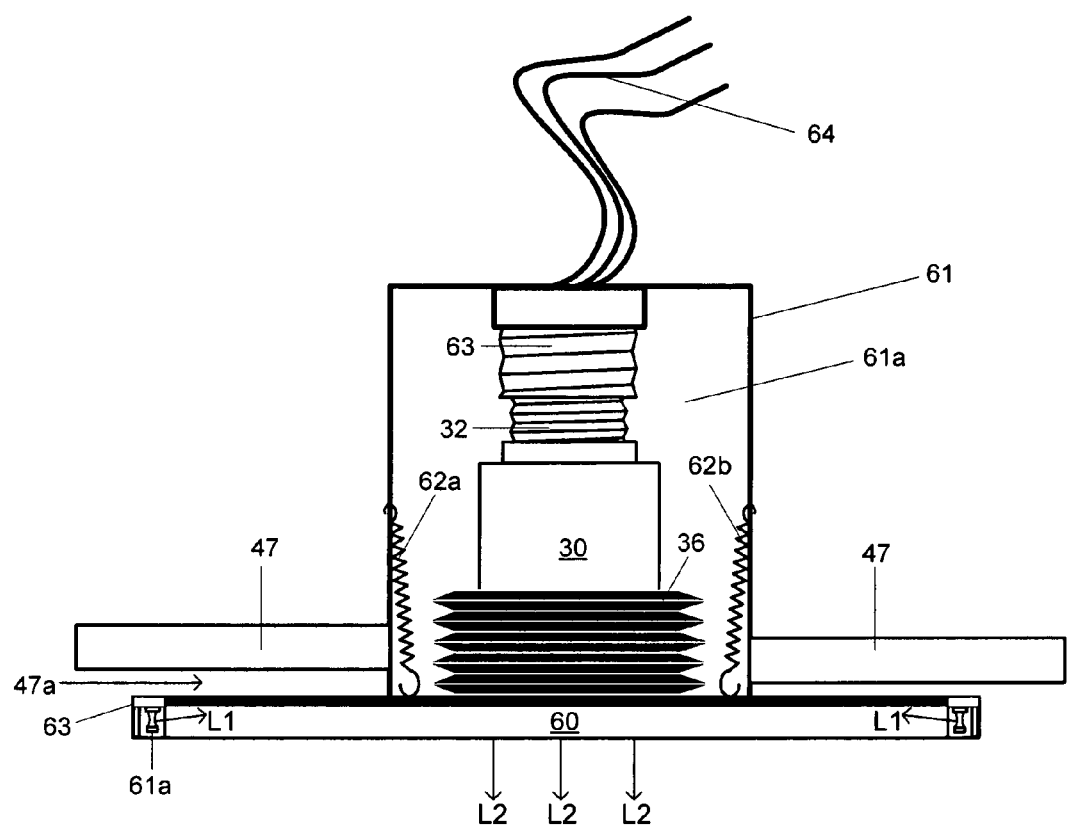
FIG. 6 shows an assembled view of an oversized circular LED panel and power supply with a flexible attachment piece.

FIG. 6 shows an assembled view of an oversized circular LED panel and power supply with a flexible attachment piece. The can 61 is affixed to the ceiling 47 using one of a number of methods that include the use of affixing tabs (not shown).

The can 61 is cylindrically shaped, as shown in FIG. 6. Alternatively, the can 61 has one of a number of different shapes including that of a rectangular prism or a prism with a triangular cross section. Alternatively, the can 61 has a spherical, semi-spherical, a shape with a circular cross section or other shape. The can 61 is made from metal, plastic or a combination thereof. The can 61 is solid and seamless. Alternatively, the can 61 may have seams, holes or ancillary cavities (not shown).

The can 61 includes a socket 63 for supplying power to the oversized circular LED panel 60 through the power supply 30 received into the socket 63. The socket 63 may alternatively receive an incandescent light bulb (not shown) or a fluorescent light bulb (not shown). The power supply 30 is electrically connected to the socket 63 by inserting the input end 32 of the power supply 30 into the socket 63 as shown in FIG. 6. The oversized circular LED panel 40 is connected to the power supply 30 by connecting the connectors 44 and 45, shown in FIG. 4a, of the oversized circular LED panel 40 to the connectors 34 and 35, shown in FIG. 3a, of the power supply 30. The connectors 44 and 45 of the oversized circular LED panel 40 and the connectors 34 and 35 of the power supply 30 are reversibly connectable. Alternatively, the connectors 44 and 45 of the oversized circular LED panel 40 and the connector 34 and 35 of the power supply 30 are permanently connected. Wires 64 connect the socket 63 to an external circuit.

Ventilation from the air passages 47a between the oversized circular LED panel 60 and the ceiling 47 cools the light emitting diodes 61, and keeps the heat given off by the light emitting diodes 61 from affecting the power supply 30. Both the oversized circular LED panel 60 and the power supply 30 can heat, during normal operation, to temperatures that could degrade the operating efficiency or the lifetime of the power supply 30 and oversized circular LED panel 60. Cooling due to ventilation created by air passages 47a prolongs the lifetime of the power supply 30 and the oversized circular LED panel 60.

As shown in FIG. 6, the power supply 30 also has a flexible attachment piece 36 that is attached to the oversized circular LED panel 60. In assembling the oversized circular LED panel 60 to the power supply 30, the flexible attachment piece 36 is slipped over the connectors 44, 45, 34 and 35 such that the connectors 44, 45, 34 and 35 are covered by flexible attachment piece 36 and hidden from view. Alternatively, the connectors 44, 45, 34 and 35 fit in a depression or recessed portion (not shown) of the oversized circular LED panel 60.

When the oversized circular LED panel 60 and power supply 30 are not installed in the can 61, a light bulb (not shown) could be inserted into the socket 63 so as to provide electrical power to the light bulb (not shown). The socket 63 is typically either a single bulb socket, as shown in FIG. 6, or is a multiple socket for multiple bulbs (not shown). In another alternative, the socket 63 has other features, such as an outlet (not shown), for supplying power to electronic devices (not shown) or additional connections, including wires (not shown), additional sockets (not shown) or pin connects (not shown).

The springs 62a and 62b allow the oversized circular LED panel 60 to be temporarily displaced from the can 61 in a direction away from the socket 63, when the oversized circular LED panel 60 is pulled in that direction by the user. Once the user ceases to pull on the oversized circular LED panel 60, the springs 62a and 62b cause the oversized circular LED panel 60 to return to the original configuration shown in FIG. 6. The displacement of the oversized circular LED panel 60 from the can 61 allowed by the spring enables the removal and replacement of the oversized circular LED panel 60 and the replacement of the power supply 30. Typically, the oversized circular LED panel 60 covers the bottom edge 61b of the can 61, as shown in FIG. 6. Alternatively, portions of the oversized circular LED panel 60 do not cover some portions of the bottom edge 61b of the can 61.

When the can 61 is fixed in place with the springs 62a and 62b, light L2 from the oversized circular LED panel 60 the flexible attachment piece 36 is in the un-extended position shown in FIG. 6. In this case, light L2 from the oversized circular LED panel 60 is directed downward. However, when the springs 62a and 62b are removed from the oversized circular LED panel 60, the oversized circular LED panel 60 with the flexible attachment piece 36 is released. In this case, the flexible attachment piece 36 may be adjusted (as illustrated in FIGS. 3c and 3d) to redirect the light L2 from the oversized circular LED panel 60 as needed.

Figure 7B:
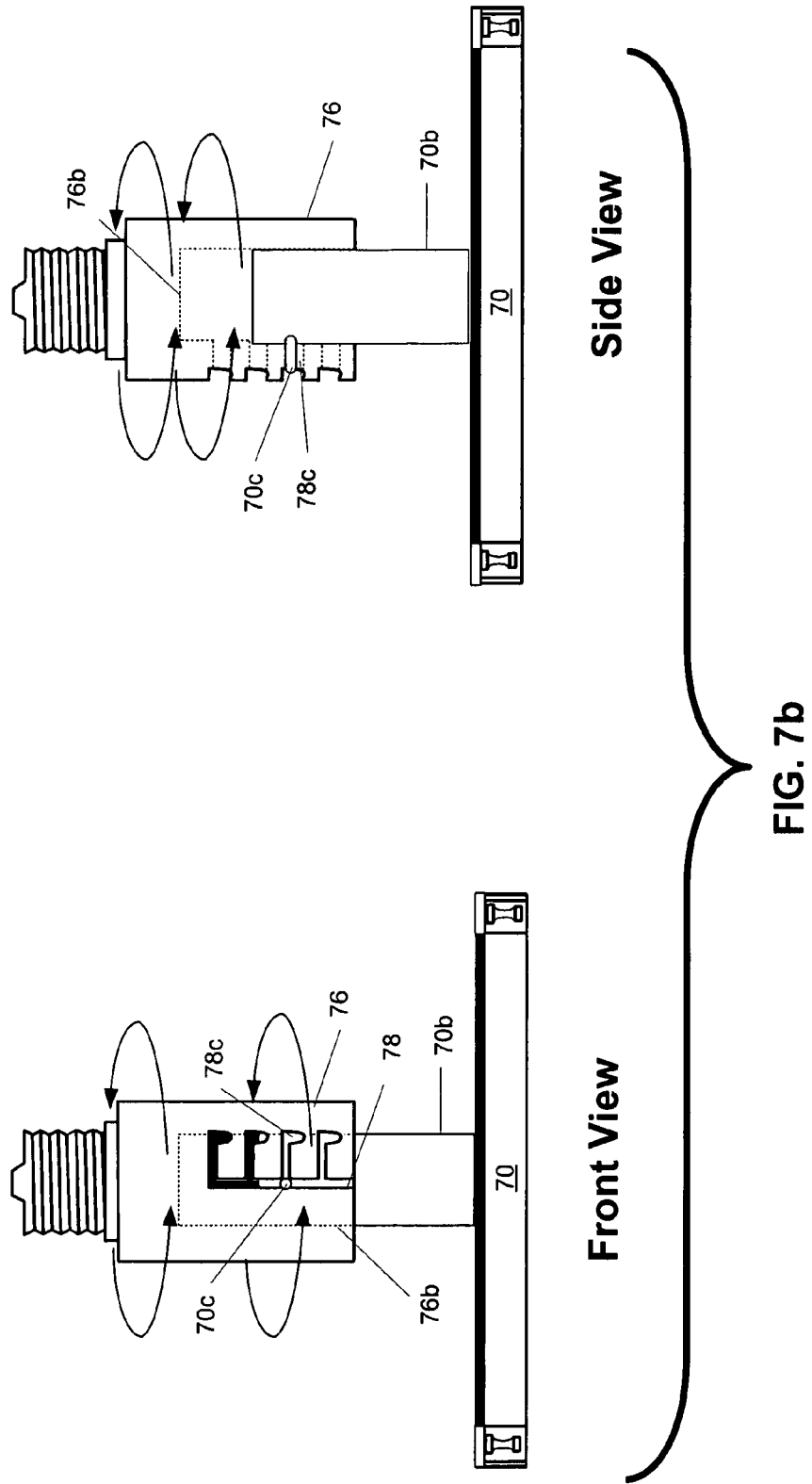
FIG. 7b shows a front and a side view of a second step in the assembly of an adjustable height circular LED panel light to an adjustable height circular LED panel light accepting power supply.

FIGS. 7a-7c show front and side views of steps in the assembly of an adjustable height circular LED panel light to an adjustable height circular LED panel light accepting power supply. As shown in FIG. 7a, the adjustable height circular LED panel light 70 includes light emitting diodes 71a placed around its circumference in the same manner as the circular LED panel light 10 of FIGS. 1a-1c. Unlike the circular LED panel light 10 of FIGS. 1a-1c, however, the adjustable height circular LED panel light 70 includes a post 70b with a knob 70c for insertion into the adjustable height circular LED panel light accepting power supply 76. The adjustable height circular LED panel light 70 has a connector 74 that is inserted into a corresponding connector 77 in the adjustable height circular LED panel light accepting power supply 76 for supplying power to the light emitting diodes 71a.

As shown in FIG. 7a, the adjustable height circular LED panel light accepting power supply 76 has an input end 76a for insertion into a socket, (not shown). As also shown in FIG. 7a, the adjustable height circular LED panel light accepting power supply 76 has a knob accepting groove 78 that accepts the knob 70c. The knob accepting groove 78 of the adjustable height circular LED panel light accepting power supply 76 contains several rest positions 78a-78d for holding the knob 70c. Although four rest positions 78a-78d are shown in FIGS. 7a-7c, there may be two, three, four or more rest positions. The adjustable height circular LED panel light accepting power supply 76 also has a post accepting hole 76b for accepting the post 70b of the adjustable height circular LED panel light 70. As illustrated in the side view of FIG. 7a, the post accepting hole 76b and the rest positions 78a-78d are connected and form one continuous hole in the interior of the adjustable height circular LED panel light accepting power supply 76.

In the first step in the assembly of an adjustable height circular LED panel light 70 to an adjustable height circular LED panel light accepting power supply 76, the connector 74 of the adjustable height circular LED panel light 70 is inserted into the corresponding connector 77 in the adjustable height circular LED panel light accepting power supply 76 (insertion not shown). Then, as shown in FIG. 7a, the post 70b of the adjustable height circular LED panel light 70 is inserted into the post accepting hole 76b of the adjustable height circular LED panel light accepting power supply 76. Simultaneously, the knob 70c of the adjustable height circular LED panel light 70 is slid into the knob accepting groove 78 of the adjustable height circular LED panel light accepting power supply 76, as shown in the Front View of FIG. 7a.

The adjustable height circular LED panel light 70 is pushed upward, as shown in FIG. 7a, until the knob 70c is parallel with the rest position 78a-78d corresponding to the desired height of the adjustable height circular LED panel light 70. FIG. 7b shows the knob 70c parallel with the rest position 78c. Once the knob 70c is parallel to the desired rest position, one of the adjustable height circular LED panel light 70 and the adjustable height circular LED panel light accepting power supply 76 is rotated relative to other, as shown in FIG. 7b, until the knob is located within the desired rest position, 78c. Then, as shown in FIG. 7c, the knob 70c is fixed in the desired rest position 78c by displacing the adjustable height circular LED panel light 70 downward slightly with respect to the adjustable height circular LED panel light accepting power supply 76. This locks in the desired height of the adjustable height circular LED panel light 70 corresponding to the desired rest position 78c, as shown in FIG. 7c.

Figure 8B:
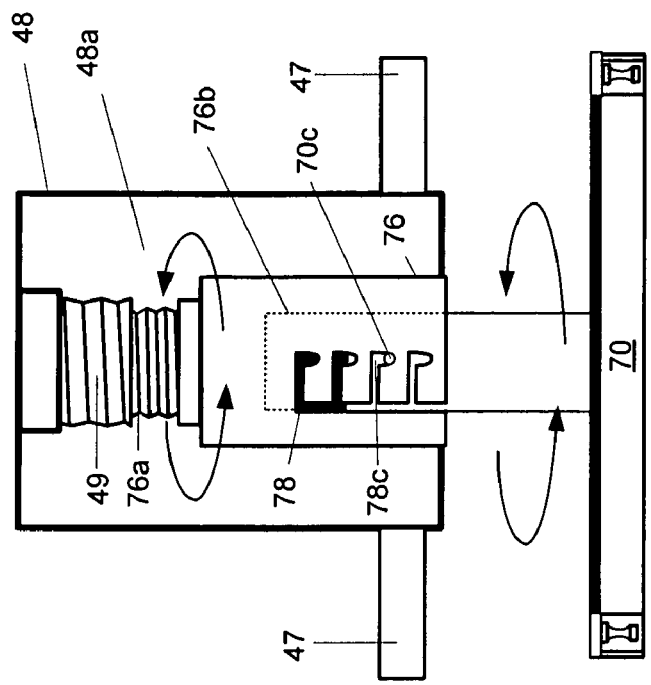
FIG. 8b shows a second step in the installation and an example height adjustment of an adjustable height circular LED panel light and power supply.
Figure 8A:
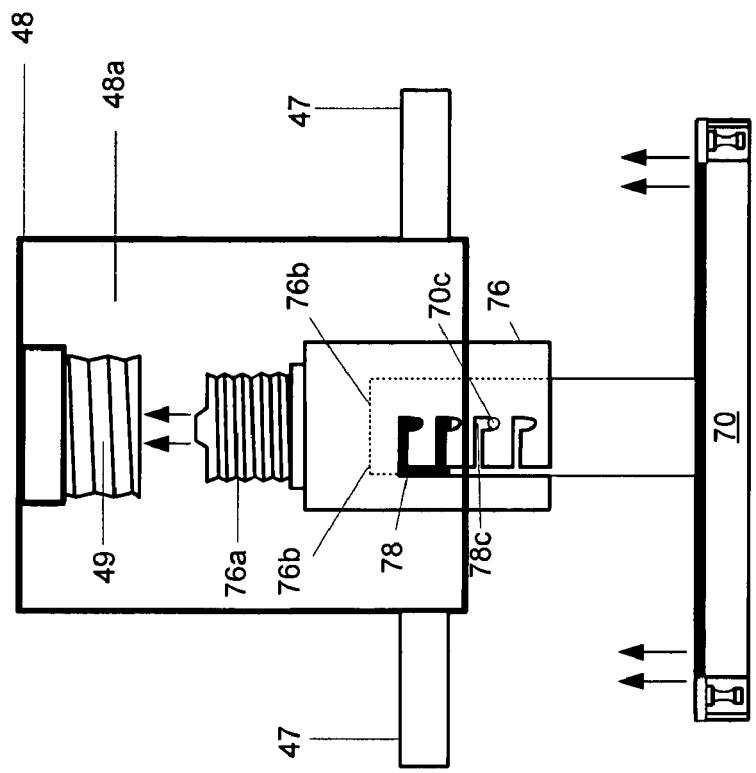
FIG. 8a shows a first step in the installation and an example height adjustment of an adjustable height circular LED panel light and power supply.

FIGS. 8a-8f show steps in the installation and example height adjustment of an adjustable height circular LED panel light and power supply. As shown in FIG. 8a, the adjustable height circular LED panel light 70 and adjustable height circular LED panel light accepting power supply 76, after being assembled as shown in FIGS. 7a-7c, are partially inserted into the interior 48a of the can 48. Then, as shown in FIG. 8b, the input end 76a of the adjustable height circular LED panel light accepting power supply 76 is placed into the socket 49 and screwed so as to tighten the connection between the input end 76a of the adjustable height circular LED panel light accepting power supply 76 and the socket 49.

Figure 8C:
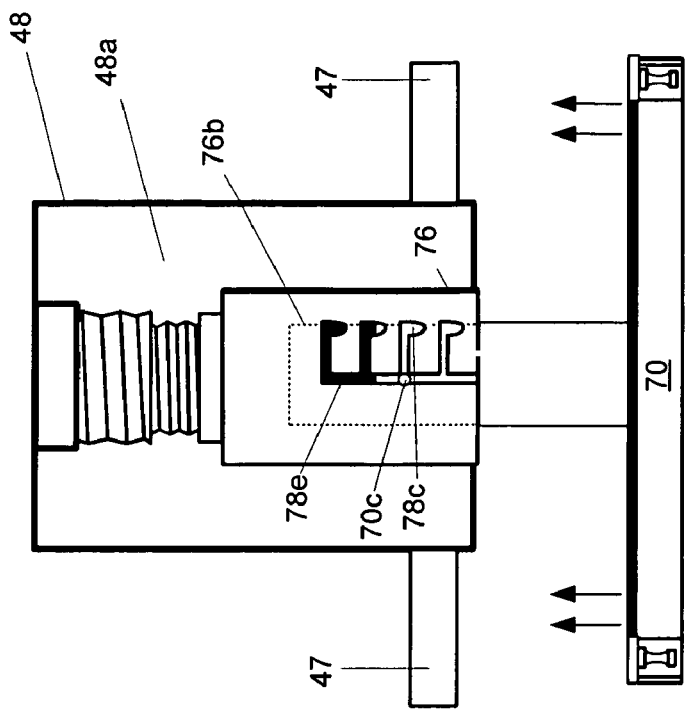
FIG. 8c shows a third step in the installation and an example height adjustment of an adjustable height circular LED panel light and power supply.
Figure 8D:
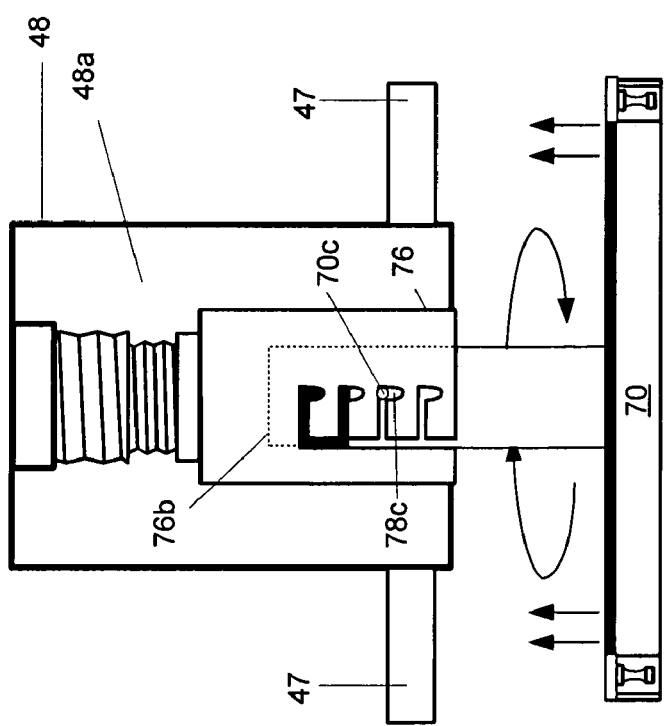
FIG. 8d shows a fourth step in the installation and an example height adjustment of an adjustable height circular LED panel light and power supply.

If a height readjustment is desired, the adjustable height circular LED panel light 70 is displaced upward and rotated with respect to the adjustable height circular LED panel light accepting power supply 76, as shown in FIG. 8c. The upward displacement and rotation shown in FIG. 8c, unlocks the knob 70c from the rest position 78c and moves the knob 70c to vertical portion 78e of the knob accepting groove 78. The knob 70c is shown in the vertical portion 78e of the knob accepting groove 78 in FIG. 8d. Subsequently, while the knob 70c remains in the vertical portion 78e of the knob accepting groove 78, the adjustable height circular LED panel light 70 is displaced either upward or downward with respect to the adjustable height circular LED panel light accepting power supply 76 so as to reposition the knob 70c and adjust the height of the adjustable height circular LED panel light 70. For example, FIG. 8d shows displacing the adjustable height circular LED panel light 70 upwardly to increase the height of the adjustable height circular LED panel light 70 relative to the ceiling 47. In the example, the knob 70c is adjusted to the desired height of rest position 78a, as shown in FIG. 8e.

Figure 8E:
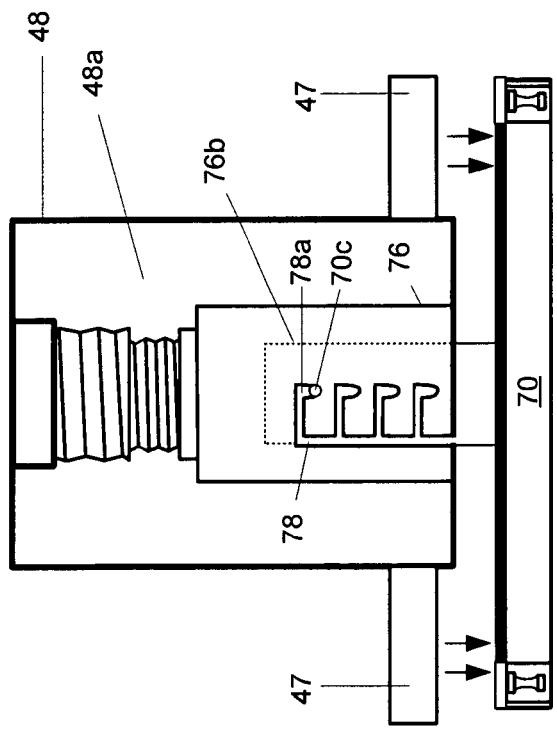
FIG. 8e shows a fifth step in the installation and an example height adjustment of an adjustable height circular LED panel light and power supply.
Figure 8F:
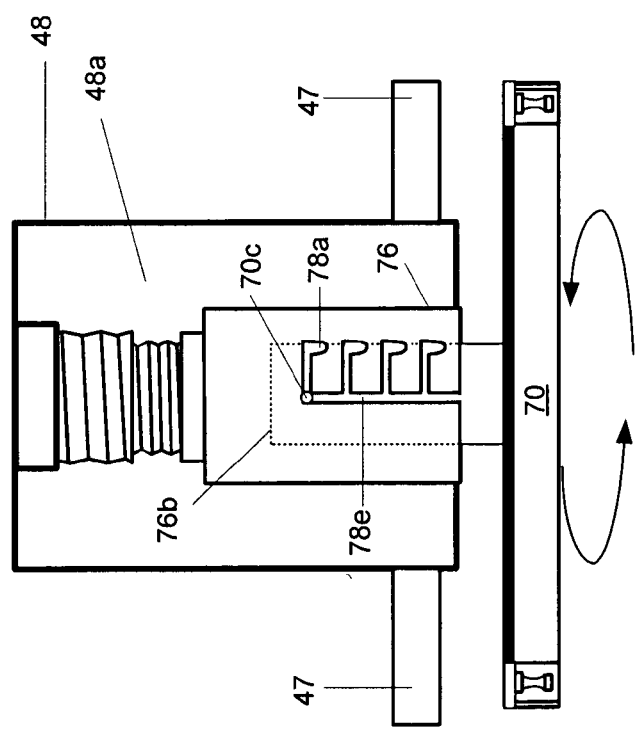
FIG. 8f shows a sixth step in the installation and an example height adjustment of an adjustable height circular LED panel light and power supply.

Then, the adjustable height circular LED panel light 70 is rotated as shown in FIG. 8e. The rotation shown in FIG. 8e brings the knob 70c to the rest position 78a. Subsequently, the adjustable height circular LED panel light 70 is displaced downward, as shown in FIG. 8f, and the knob 70c is locked into place in the desired rest position 78a. Displacing the adjustable height circular LED panel light 70 downward also locks the height adjustment of the adjustable height circular LED panel light 70, as shown in FIG. 8f.

Figure 9:
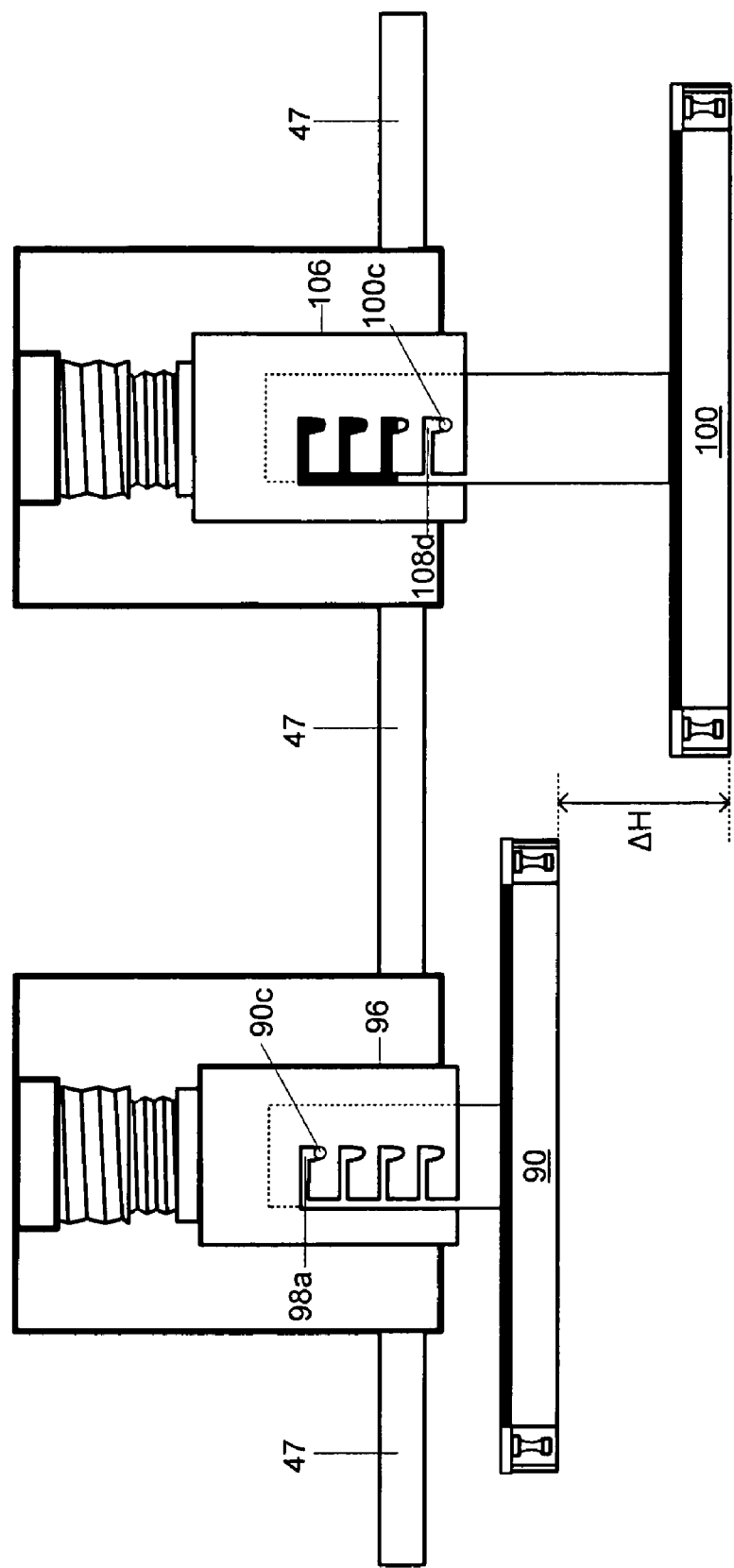
FIG. 9 shows a comparison between two different settings of an adjustable height circular LED panel light to an adjustable height circular LED panel light accepting power supply.

FIG. 9 shows a comparison between two different settings of an adjustable height circular LED panel light to an adjustable height circular LED panel light accepting power supply. FIG. 9 shows an adjustable height circular LED panel light 90 with its knob 90c set in the rest position 98a of the corresponding adjustable height circular LED panel light accepting power supply 96. FIG. 9 also shows another adjustable height circular LED panel light 100 with its knob 100c set in the rest position 108d of the corresponding adjustable height circular LED panel light accepting power supply 106. ΔH, as further shown in FIG. 9, is the height difference between adjustable height circular LED panel lights 90 and 100 as a result of the different positions of knobs 90c and 100c, respectively.

It will be apparent to those skilled in the art that various modifications and variations is made in the recessed can lighting device of embodiments of the invention without departing from the spirit or scope of the invention. Thus, it is intended that embodiments of the invention cover the modifications and variations of this invention provided they come within the scope of the appended claims and their equivalents.

What is claimed is:

1. A lighting device comprising:
    a light emitting diode lighting panel having first and second opposing surfaces;
    light emitting diodes at a periphery of light emitting diode lighting panel for entering light into an incident surface and emitting the light through the first surface;
    a reflective surface at the second surface of the light emitting diode lighting panel; and
    a power supply unit connected to the light emitting diode panel, the power supply having first and second ends, and electrical circuitry for converting alternating current to direct current between the first and second ends,
    wherein the first end is for insertion into a socket for one of an incandescent and fluorescent light bulb, and the light emitting diode lighting panel is adjustably connected to the second end of the power supply unit.

2. The lighting device of claim 1, further comprising:
    a first connector attached to the second surface of the light emitting diode lighting panel; and
    a second connector for reversibly connecting the power supply to the light emitting diode lighting panel and for attachment to the second end of the power supply unit.

3. The lighting device of claim 1 wherein the light emitting diode lighting panel includes a flexible strip of light emitting diodes and a light guide panel.

4. The lighting device of claim 1, further comprising a knob and a groove wherein the distance between the first end of the power supply and the light emitting diodes is adjusted by sliding the knob in groove.

5. The lighting device of claim 4, wherein the light guide panel has a convex surface.

6. A lighting device comprising:
    a light emitting diode lighting panel having first and second opposing surfaces;
    light emitting diodes arranged at a periphery of the light emitting diode lighting panel for entering light into an incident surface and emitting the light through the first surface;
    a reflective surface on the second surface of the light emitting diode lighting panel;
    a power supply unit for the light emitting diode panel containing electrical circuitry for converting alternating current to direct current, and the power supply unit having first and second ends; and
    a flexible attachment piece attached to the second end of the power supply for redirecting the light emitting diode lighting panel, and the first end is a socket for one of an incandescent and fluorescent light bulb.

7. The lighting device of claim 6, further comprising:
    a first connector attached to the second surface of the light emitting diode lighting panel; and
    a second connector for reversibly connecting the power supply to the light emitting diode lighting panel and for attachment to the second end of the power supply unit.

8. The lighting device of claim 6, wherein the light emitting diode lighting panel includes a flexible strip of light emitting diodes and a light guide panel.

9. The lighting device of claim 6, further comprising a knob and a groove wherein the distance between the first end of the power supply and the light emitting diodes is adjusted by sliding the knob in groove.

10. The lighting device of claim 9, wherein the light guide panel has a convex surface.

11. A lighting device for insertion into a can having an opening, comprising:
    a light emitting diode lighting panel having first and second opposing surfaces;
    light emitting diodes arranged at a periphery of the first surface of the light emitting diode lighting panel for entering light into an incident surface and emitting the light through the first surface;
    a reflective surface on the second surface of the light emitting diode lighting panel; and
    a power supply unit for the light emitting diode panel containing electrical circuitry to convert alternating current to direct current, and the power supply unit having first and second ends, wherein: the first end of the power supply has a first cross-sectional width and fits into a socket for one of an incandescent and fluorescent light bulb, and the light emitting diode panel has a second width greater than four times the first cross-sectional width of the first end of the power supply unit and is adjustably connected to the second end of the power supply unit.

12. The lighting device of claim 11, wherein the light emitting diode lighting panel is affixed to a side of the can via a spring.

13. The lighting device of claim 11, wherein the lighting device further includes a flexible attachment piece that attaches the second end of the power supply to the light emitting diode lighting panel.

14. The lighting device of claim 11, wherein the lighting device further includes:
    a first connector attached to the second surface of the light emitting diode lighting panel; and
    a second connector for reversibly connecting the power supply to the light emitting diode lighting panel and for attaching to the second end of the power supply unit.

15. The lighting device of claim 11, wherein the light emitting diode lighting panel includes a flexible strip of light emitting diodes and a light guide panel.

16. The lighting device of claim 11, further comprising a knob and a groove wherein the distance between the first end of the power supply and the light emitting diodes is adjusted by sliding the knob in groove.

17. The lighting device of claim 16 wherein the light guide panel has a convex surface.

* * * * *